Aug. 12, 1958 V. G. SMALL 2,846,956

HINGE CONSTRUCTION FOR DROP END GATES

Filed Nov. 14, 1952 2 Sheets-Sheet 1

INVENTOR.

Victor G. Small,

BY Sabin C. Bronson.

Atty.

Aug. 12, 1958 V. G. SMALL 2,846,956

HINGE CONSTRUCTION FOR DROP END GATES

Filed Nov. 14, 1952 2 Sheets-Sheet 2

INVENTOR.
Victor G. Small,
BY Sabin C. Bronson
atty

United States Patent Office 2,846,956

Patented Aug. 12, 1958

1

2,846,956

HINGE CONSTRUCTION FOR DROP END GATES

Victor G. Small, Elmwood, Ill., assignor to Standard Railway Equipment Manufacturing Company, Chicago, Ill., a corporation of Delaware Application November 14, 1952, Serial No. 320,529

3 Claims. (Cl. 105—253)

This invention relates to drop end gates for railway gondola cars, and especially to the hinge construction thereof.

The invention is directed to the type of end gate shown in the patent to Swann No. 2,452,163, and is aimed at overcoming certain disadvantages which inhere in the construction and use thereof.

End gates of this type have previously been made of a gate panel having a hollow structural member at or adjacent its lower edge, into which journal bars or hinge pins are installed and welded into position to constitute trunnions on which the gate hinges. The gate is arranged between the upright corner posts of a gondola car, which are provided at their lower inner portions with journal bearings for the accommodation of the trunnions. Due to the relationship of the parts, it is necessary that only one of the bearings be installed prior to the installation of the gate, since the trunnions are fixed and must be inserted by bodily movement of the gate axially of the hinge into the bearings. Since the latter are inside of the corner posts, the gate trunnion may be pushed into one bearing already in place, while the other bearing must be first engaged upon the opposite trunnion and then moved into position with the gate before fastening to the corner post. This not only involves an inconvenient mode of construction, but is subject to the further disadvantage that, due to limitations of space, the axial extent of hinge bearing is considerably curtailed, so that the end gate trunnions have been known to pull free of the bearings permitting the gate to fall off. This frequently happens when the gondola car is dumped by standard car dumping mechanisms, in which the entire car is bodily overturned, which occasions some displacement between the sides of the car sometimes sufficient to dislodge the trunnions from the hinge bearings.

It is the primary object of the present invention to provide a hinge bearing which offers considerably simplified techniques in the matter of installation, and which provides a much more substantial depth of bearing between the movable gate and the corner posts of the car, almost entirely obviating the possibility of the end gates falling off the car when overturned, because of distortion due to impacts received during service movements of the cars.

In its preferred form, the hinge pins are free to move to a limited extent axially of the hollow structural member of the gate, and are applied after the gate is in its final position either by providing bearings that extend completely through the end posts to the outer sides of the car, through which the hinge pins may be inserted, or else the hinge pins are predisposed within the hollow section of the gate for movement outwardly, like a sliding bolt, into engagement with the bearings in the corner posts.

Reference will now be made to the attached drawings, in which—

Since opposite ends of a car made in accordance with the present invention are identical in construction, only one will be described here.

Figure 5:
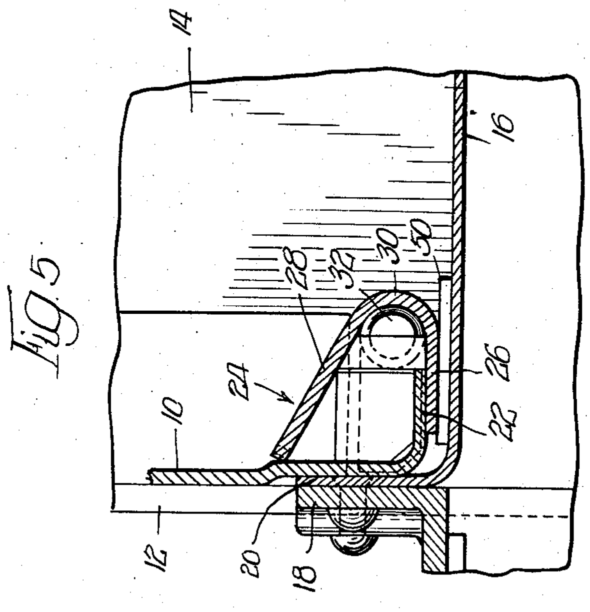
Figure 5 is a sectional view taken along line 5—5 of Figure 1, looking in the direction of the arrows.

In the accompanying drawings, an end gate 10, which may be of any desired construction, such as that shown in the aforementioned Swann patent, is suspended between corner posts 12, to which side sheets 14 of the car are attached. The car bottom is formed by a floor sheet 16 which extends between the side sills of the car, and which at the end sills 18 (Fig. 5) curves upwardly to form a flange 20 which engages the outer face of the end gate 10 adjacent to its bottom. The lower edge of the gate 10 is formed inwardly into a horizontal flange 22 which is joined with a curved plate having a bottom leg 26 connected (as by welding) to the flange 22, and an upwardly sloping leg 28, which is joined to the lower leg 26 by a curved portion 30, and which closes with the main panel of the gate 10 to comprise a hollow structural beam 24. This beam performs the dual purpose of strengthening the lower edge of the gate panel, and of providing a hollow bearing for the acsommodation of hinge pins or trunnions 32 in a manner which will now be described.

Figure 2:
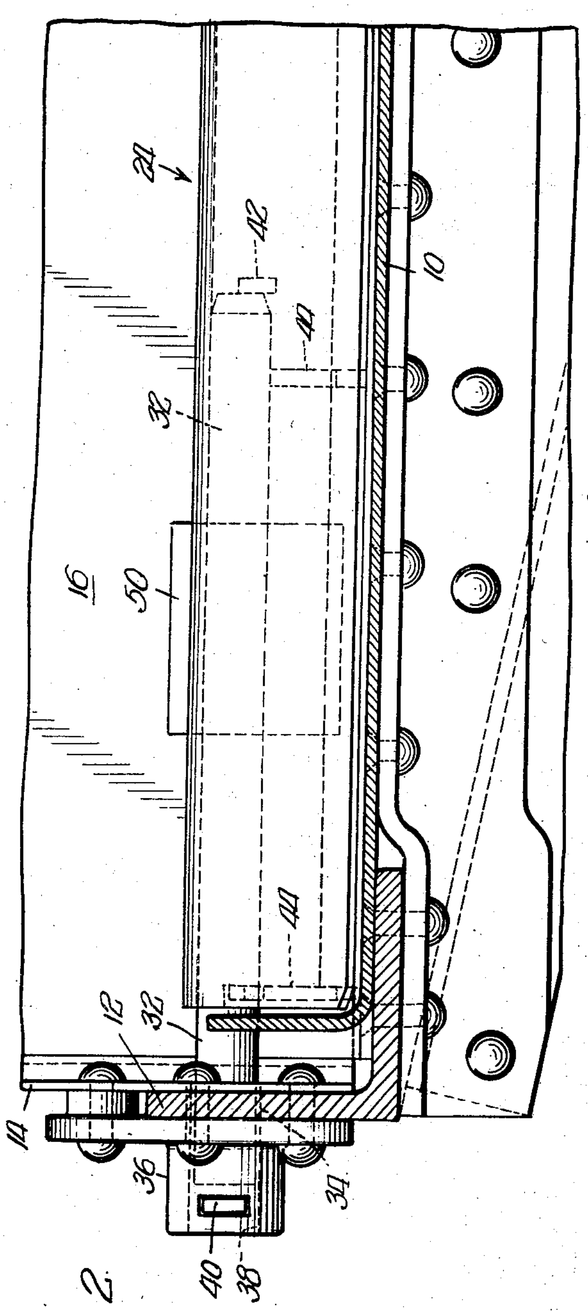
Figure 2 is a sectional view taken along line 2—2 of Figure 1.
Figure 1:
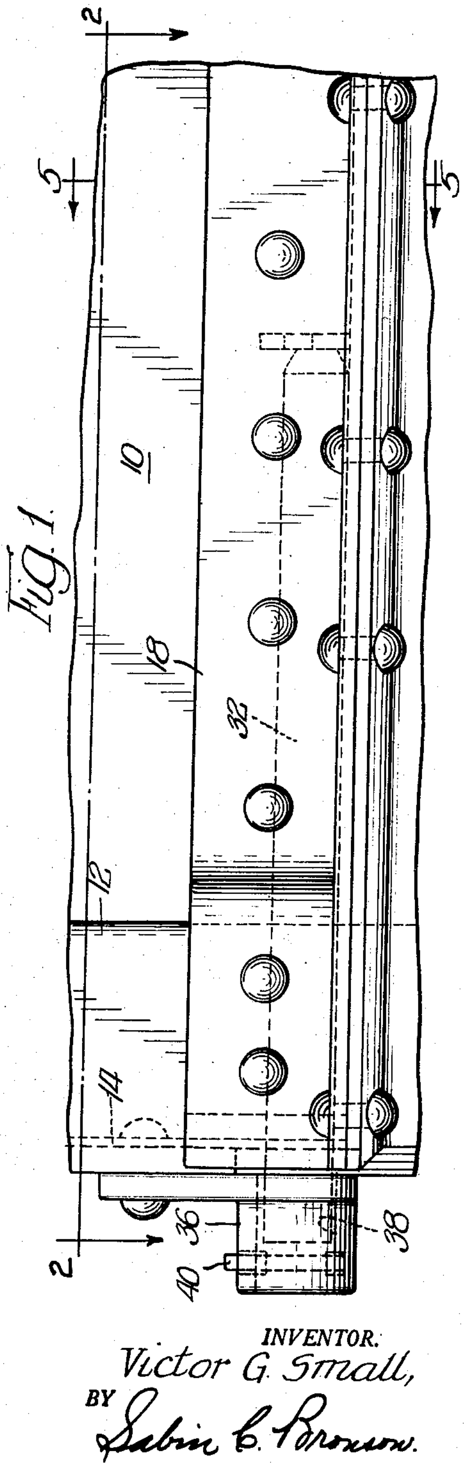
Figure 1 is a front view of the lower outer corner portion of an end gate showing its attachment to the corner post of the car.
Figure 4:
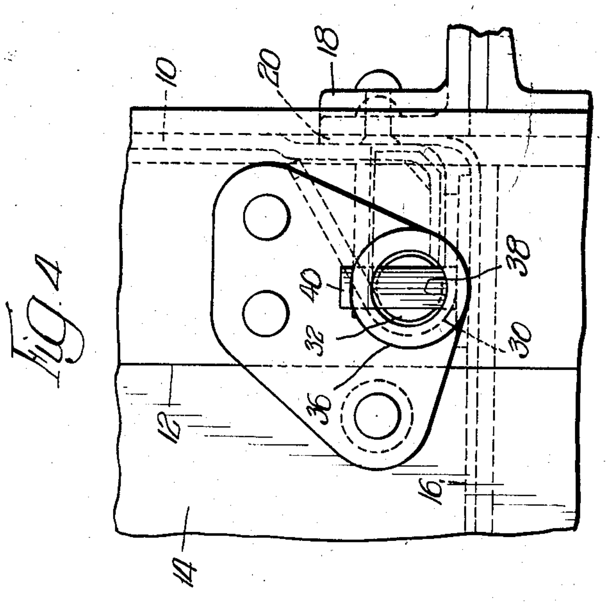
Figure 4 is a side elevational view of Figure 1.

In the embodiment shown in Figures 1, 2 and 4 of the drawings, the corner posts 12 and the side sheets 14 are perforated as at 34 in Figure 2 to permit the hinge pins 32 to pass therethrough. A bearing 36 in axial alignment with the perforations 34 at each of the corner posts is welded or riveted to the outside of the latter so that the inside corner of the car is left clear, thus to avoid the necessity for relieving the bottom corners of the gate panel, as is conventionally done in prior constructions to accommodate internally disposed bearings.

The bearings 36 are provided with an internal bearing surface 38, which passes through their extent transversely of the car, through which the hinge pins may be inserted. There is provided a key 40 which is arranged to drop vertically through openings prepared for this purpose in each bearing to close the ends thereof. The keys are then secured by welding. In this arrangement the bearings for the hinge pins are installed in their entirety before the end gate 10 is placed in position. When this is done, and with the keys 40 removed from the bearings, the hinge pins 32 are pushed through the bearings from the outside of the car into the aligned beam 24, which comprises the bottom edge of the gate 10 a distance equal to at least half their lengths. In this form, there will have been already welded into place within the beam a suitable stop 42, which limits the inward movement of the hinge pins axially of the beams in each instance. Also, in order to confine the hinge pins to the conforming internal curvature of the curved portion 30 of the beam 24, suitable inserts 44, shaped to this purpose, are welded into place at positions spaced axially of the hinge pins 32 to confine the latter radially.

Figure 3A:
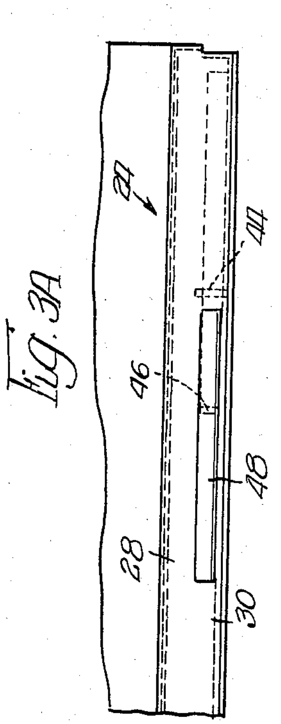
Figure 3A is a similar view corresponding to the opposite end of the construction of Figure 3, in which certain modifications of the invention have been illustrated.
Figure 3:
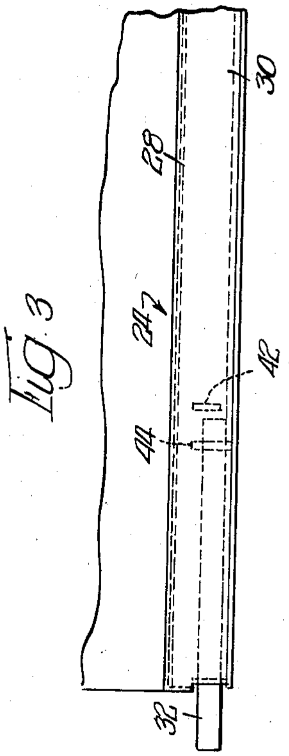
Figure 3 is a broken rear elevational view of the lower portion of an end gate embodying the invention.

This latter construction is exemplified in Figure 3; while in Figure 3A, an alternative arrangement is contemplated which will permit the pins to be predisposed within the hollow beam 24 at the time the gate is placed in position between the corner posts. In this embodiment, the stops 42 are omitted and the pins are completely retracted within the beam at some position indicated by the dotted line 46 which appears in Figure 3A. The beam is provided with a slot 48 through which the hinge pins may be engaged, when the gate is positioned between the corner posts, and pushed axially, after the manner of a sliding bolt, through the corner post and side wall perforations 34 into engagement with the bearings 36. The pins may then be fastened as by spot welding. In this embodiment, the keys of the bearings may be installed permanently to close the outer ends thereof, or the bearings may be completely closed, as in the case of a cup-shaped member, and installed before the gate is placed into position. When this construction is employed, it is obvious that one pin may be permanently secured to the gate beam, while the other is adapted to perform the bolt-like movement.

In order to spare the floor of the car unnecessary wear due to the raising and lowering of the gate around the axis of the hinge pin 32, it is desirable to provide metal pads 50 between the bottom flange of the gate 26 and the floor 16 of the car.

It will be noted from these arrangements, that the hinge pins project for a substantial portion of their length through the corner posts and side wall plates of the car into the bearings, and are retained against axial movement. Their inner ends also penetrate the beam members for more than half the length of the pins, thus to insure adequate bearing area in that direction. Any tendency for the pins to withdraw from the bearings is thus precluded, irrespective of the degree of spring or distortion to which the walls of the car may be subjected during loading and unloading operations.

Furthermore, greatly simplified techniques of construction and assembly are made possible by the present invention so as to permit the end structure of the car to be completely assembled, including the bearings for the end gate, at the time the gate is placed in position, and to permit the end gate to be rapidly secured by the manipulation of the pins between the gate beam and the corner post bearings.

I claim:

1. Hinge construction for drop end gates on railway gondola cars, and the like, having upright corner posts at its ends, a bearing opening through each of said posts near its bottom, a gate positioned between said posts across said car, said gate having an enclosed flange adjacent its bottom edge, hinge pin bearings outboard of said posts and secured thereto and in axial alinement with said bearing openings and enclosed flange, hinge pins extending through said bearings and bearing openings and projecting into said enclosed flange, and key means for holding said hinge pins in assembled relationship.

2. A drop end gate for railway gondola cars, or the like, having upright corner posts, said gate comprising a panel extending between said posts, a bearing opening through each post adjacent its lower end, a hollow beam at the lower edge of said panel, a hinge pin bearing secured to the outside of each post, said beam, bearing openings and hinge pin bearings being in axial alinement, a pair of hinge pins each slidable axially through a bearing, bearing opening and into opposite ends of said beam to provide trunnions on which the gate hinges, and an elongated opening in said beam intermediate its ends through which an end of either hinge pin may be engaged to slide same axially of said beam, bearing openings and bearings.

3. A gondola car end assembly including corner posts extending vertically upward, a bearing opening through each of said posts near its bottom extending in coaxial alinement to each other, a drop end gate extending between said corner posts, a hollow beam at the lower edge of said gate extending from side to side thereof, a hinge pin bearing secured to the outside of each post in horizontal axial alinement with said bearing openings and hollow beam, a pair of hinge pins each extending axially through said bearing, bearing opening and into said beam at its opposite ends, stops fixed within the beam for limiting the extent of penetration of said pins inwardly of said beam, respectively, said hinge pins being insertable through said bearings, posts, and into said beam, and key means for closing said bearings, respectively, for preventing the accidental withdrawal of said hinge pins.

References Cited in the file of this patent

UNITED STATES PATENTS

| | | |
|---|---|---|
| 448,707 | Broadbooks | Mar. 24, 1891 |
| 888,286 | Wilhite | May 19, 1908 |
| 1,620,701 | Teich | Mar. 15, 1927 |
| 1,712,534 | Walsh et al. | May 14, 1929 |
| 1,829,073 | Tobin et al. | Oct. 27, 1931 |
| 1,903,509 | Jones | Apr. 11, 1933 |
| 1,904,110 | Willmann | Apr. 18, 1933 |
| 2,044,638 | Sanford | June 16, 1936 |
| 2,061,318 | Gilpin | Nov. 17, 1936 |
| 2,090,569 | Bagley | Aug. 17, 1937 |
| 2,184,259 | Seaman | Dec. 19, 1939 |
| 2,430,942 | McGiff | Nov. 18, 1947 |
| 2,452,163 | Swann | Oct. 26, 1948 |
| 2,553,457 | Ingram | May 15, 1951 |